Feb. 26, 1935.  W. N. PAXTON  1,992,716
AUTOMATIC WEIGHING MACHINE DISCHARGE REGULATING TYPE
Filed April 8, 1932  4 Sheets-Sheet 1

INVENTOR.
WILLIAM N. PAXTON.
BY HIS ATTORNEYS.

Feb. 26, 1935. W. N. PAXTON 1,992,716
AUTOMATIC WEIGHING MACHINE DISCHARGE REGULATING TYPE
Filed April 8, 1932 4 Sheets-Sheet 2

INVENTOR.
WILLIAM N. PAXTON.
BY HIS ATTORNEYS.
Williamson & Williamson

Feb. 26, 1935. W. N. PAXTON 1,992,716
AUTOMATIC WEIGHING MACHINE DISCHARGE REGULATING TYPE
Filed April 8, 1932 4 Sheets-Sheet 3

INVENTOR.
WILLIAM N. PAXTON.
BY HIS ATTORNEYS.

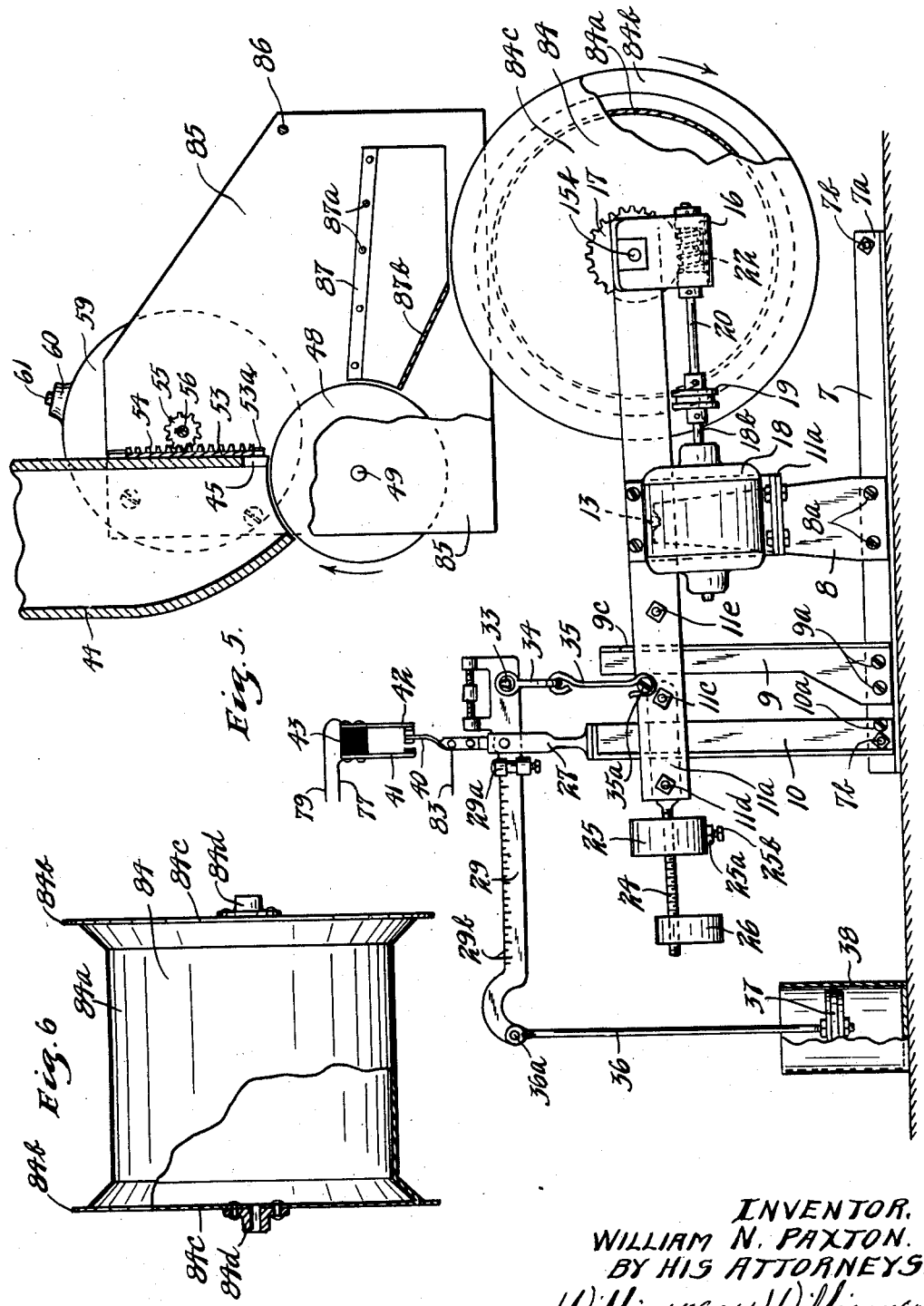

Patented Feb. 26, 1935

1,992,716

UNITED STATES PATENT OFFICE 1,992,716

AUTOMATIC WEIGHING MACHINE-DISCHARGE REGULATING TYPE

William N. Paxton, Minneapolis, Minn.

Application April 8, 1932, Serial No. 603,986

9 Claims. (Cl. 83—44).

My invention relates to weighing devices and more particularly to devices for automatically regulating the weight of granular or powdered material flowing per unit of time.

An object of my invention is to provide a device which will automatically maintain a flow of a given weight of granular or powdered material per unit of time through material conveying equipment.

Another object is to provide a device of the class described wherein the flow of material may be varied and wherein the adjustment means may be calibrated to permit convenient and selective adjustment for a flow of a predetermined weight of material per unit of time.

A still further object is to provide a device of the class described wherein granular or powdered material flowing through an adjustable gate in the lower end of a chute is conveyed across the platform of a weighing scale, the deflection of said scale being used to control means for adjusting the position of said gate and thereby maintain a flow of a constant weight of material per unit of time.

These and other objects and advantages of the invention will be fully set forth in the following description, made in connection with the accompanying drawings, in which like reference characters refer to similar parts throughout the several views, and, in which:—

Fig. 4 is a view showing the electrical contacting device, the solenoid, and the electrical connections therebetween, used in connection with control of the material feeding gate in my invention;

Fig. 5 is a partially fragmentary side view of a modified form of my invention; and Fig. 6 is a partially fragmentary view of the material conveying drum used in the modified form of my invention.

Figure 1:
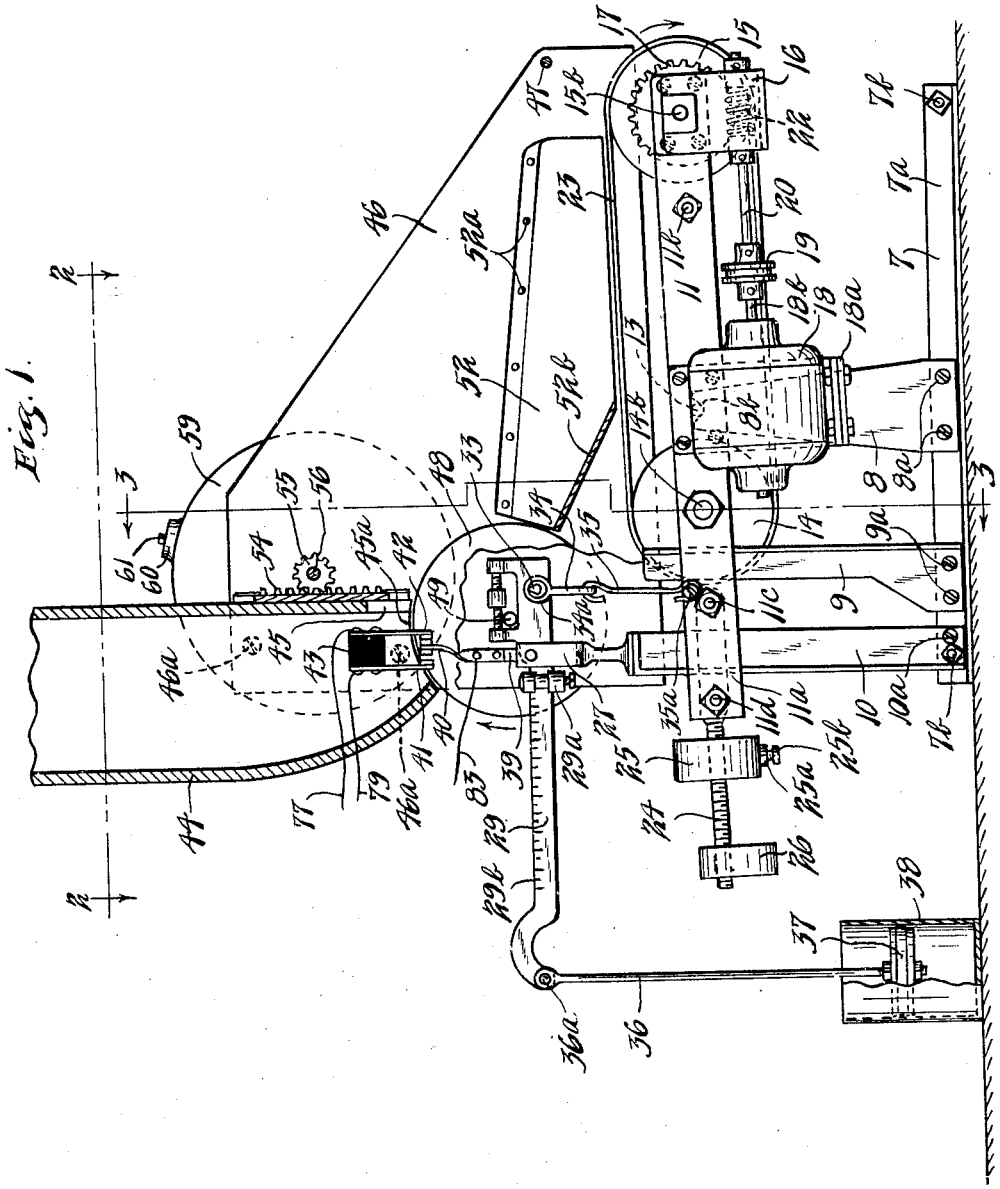
Fig. 1 is a partially sectional and fragmentary side view of the preferred form of my invention.
Figure 2:
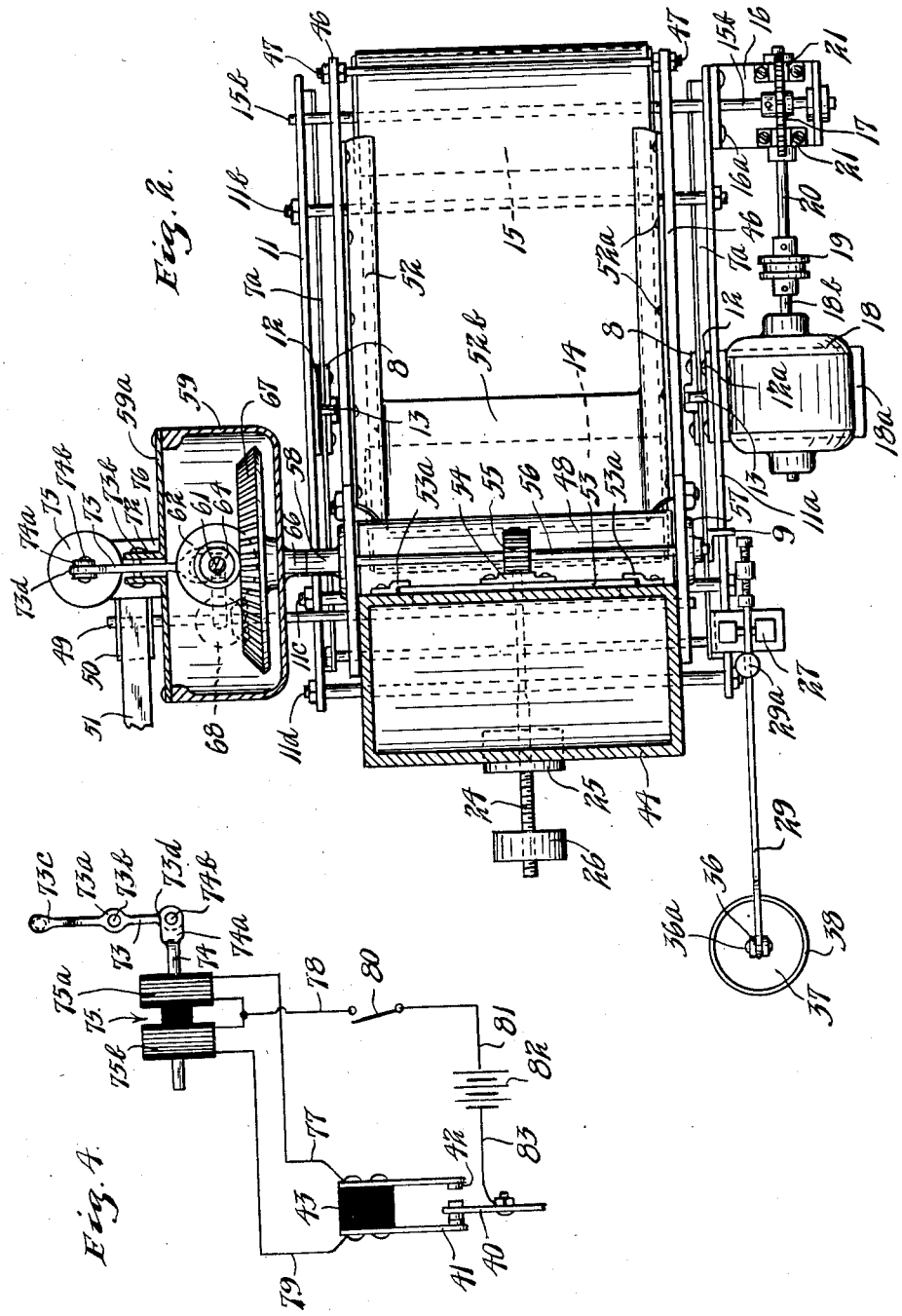
Fig. 2 is a horizontal sectional view taken along the lines 2—2 of Fig. 1.
Figure 3:
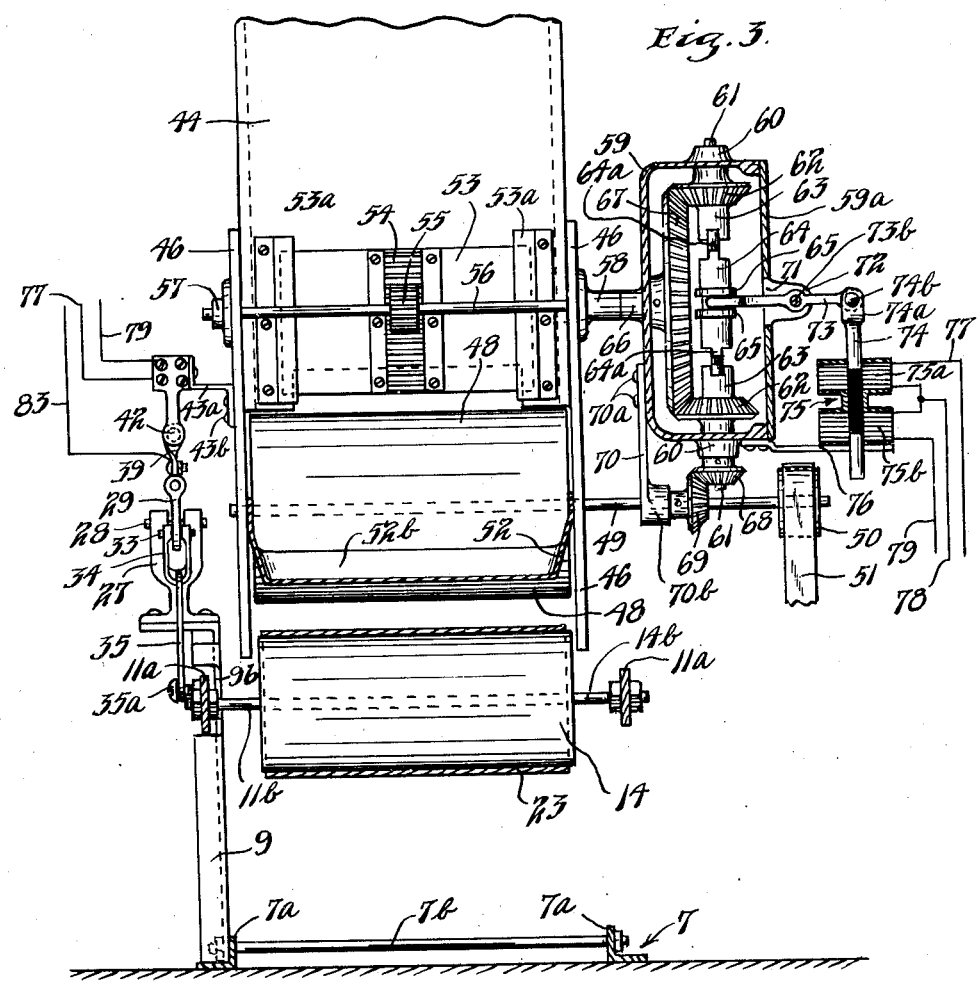
Fig. 3 is a vertical sectional view taken along the lines 3—3 of Fig. 1.

Referring to the drawings, a substantially rectangular base designated as an entirety by the numeral 7, is formed of two horizontally disposed longitudinal side members 7a, held in spaced relation by means of rods 7b, said side members being rigidly attached to the end portions of said rods.

Three vertical members 8, 9 and 10 are rigidly attached to one of the horizontal members 7a by means of screws 8a, 9a and 10a, respectively, said vertical members extending upward from the horizontal members 7a. To the other horizontal member 7a are similarly attached three vertical members 8, 9 and 10, similar to and located directly opposite the first mentioned vertical members 8, 9 and 10.

The upper end of each vertical member 8 is formed into a V or crotch 8b for the purpose of forming a fulcrum recess.

A substantially rectangular scale frame designated as an entirety by the numeral 11, is somewhat wider and longer than the base 7 and is formed of two longitudinal side members 11a held in spaced relation by means of rods 11b, 11c, and 11d.

At substantially the middle of each side member 11a, a plate 12 carrying an inwardly projecting trunnion pin 13 is secured to the side member 11a by means of the screws 12a. The trunnion pins 13 rest in the V's or crotches 8b of the vertical members 8, the framework 11 thus being pivotally supported. The vertical member 9 is cut away as at 9b to serve as an upper end lower limit to the motion of the framework 11.

Inward of the plate 12 the side members 11a are provided with apertures 14a in which the end portions of a rod 14b are rigidly supported. A drum 14, axially apertured to receive the rod 14b, is rotatably mounted on said rod.

At the outer end of the framework 11, the side members are provided with apertures 15a in which a shaft 15b is journaled, said shaft projecting outward of the frame 11 at one end thereof. A drum 15, axially apertured to receive the shaft 15b is mounted on the shaft 15b in fixed relation thereto.

A U-shaped bracket 16 is attached to the outer surface of the side member 11a by means of screws 16a, said bracket being suitably located and provided with apertures to permit journaling of the projecting portion of the shaft 15b in said apertures. Said shaft is journaled in said apertures and carries a worm wheel 17 attached in fixed relation thereto and disposed between the inner and outer portions of the bracket 16.

An electric motor 18 is mounted on a bracket 18a, said bracket being secured to the side member 11a on the side thereof opposite the plate 12. The axis of rotation of the motor is horizontally disposed in a vertical plane parallel to the vertical plane in which the side member 11a is located. Said motor has a projecting shaft 18b which is connected to a shaft 20 by means of a flexible coupling 19. The end of the shaft 20 opposite the end on which the flexible coupling 19 is mounted extends under the worm wheel 17 and is journaled in two bearings 21, said bearings being secured to the lower portion of the U-shaped bracket 16. A worm 22 is mounted on the shaft 20 in fixed relation thereto at a point immediately below the worm wheel 17, said worm being engaged with the teeth of the worm wheel 17.

An endless belt 23 similar in width to the length of the drums 14 and 15 is tightly stretched about the drums 14 and 15.

A bar 24, rectangular in cross section through a portion of its length and circular in cross section through the remainder of its length, is provided with two apertures through the portion having a rectangular cross section. By means of said apertures, the bar 24 is mounted on the rods 11c and 11d, substantially at the middle portions of said rods, and with the portion having a circular cross section extending outward of the frame 11. The portion of the bar 24 which is circular in cross section is provided with external screw threads.

A weight 25, of cylindrical shape, having an internally threaded aperture concentrically located with respect to the circular periphery thereof, is mounted by means of said screw threads on the inner portion of the threaded part of the bar 24. A boss 25a is located on the outer surface of the weight 25 and an internally threaded aperture extends from the outer surface of said boss to the axially located threaded aperture of the weight 25. A set screw 25b is engaged with the threads of last mentioned aperture.

A second cylindrically shaped weight 26 is provided with an internally threaded aperture eccentrically located with respect to its circular periphery. The weight 26 is mounted on the outer portion of the threaded part of the bar 24 by means of said internal screw threads.

An upwardly extending bracket 27 is secured to the upper end of the vertical member 10, said bracket being forked at its upper end and said forked portion being adapted to serve as a fulcrum for a scale beam. A scale beam 29 of conventional form having a long arm and a short arm, is fulcrumed on the forked portion of the bracket 27. The longer or outer arm of the scale beam is provided with a slidable weight 29a and a stamped scale 29b. A boss 33 extends outward from each side of the short arm of the scale beam near the outer end thereof, said boss being so shaped that the upper portion thereof forms a knife edge. A U-shaped member 34 has a ring 34a formed at the free end of each side, said rings being disposed in parallel planes at right angles to the plane in which the U-shaped member lies. The inner surfaces of the outermost portions of the two rings 34a of the member 34 rest upon the upper or knife edge portion of the two bosses 33. A link 35 is suspended from the U-shaped member 34 by means of the hook at the upper end thereof. A hook at the lower end thereof engages a screw 35a said screw being attached to the outer side of the side member 11a of the frame 11.

At the outer end of the long arm of the scale beam an aperture is provided therein. A rod 36, is pivotally attached to the outer end of said arm by means of a pin 36a, said pin passing through apertures in the said arm and said rod. A piston 37 is rigidly mounted on the lower end of said rod. The piston 37 is disposed within a cylinder 38 within which said piston fits loosely to form an air dashpot.

An upwardly projecting arm 39 is rigidly attached to the scale beam 29 at a point immediately above the fulcrum. The upper portion of the arm 39 carries an electrical contact 40 which is insulated therefrom. Cooperating with said contact are two stationary contacts 41 and 42, one of which is located at each side of the contact 40 and each of which is independently attached to an insulating support 43. The support 43 is attached to a bracket 43a which in turn is attached to the guide member 46, to be described later. The contacts 41 and 42 are so located relative to the moving contact 40 that said moving contact will engage with the stationary contact 41 when the long arm of the scale beam is deflected downward and with stationary contact 42 when said arm of the scale beam is deflected upward. The relation of the above described electrical contacts to other parts of my invention will be disclosed in one of the following paragraphs.

A vertically disposed material conveying chute or head 44 of rectangular cross section and comprising four imperforate side members is connected at its upper end to a source from which a continuous supply of material is available. At its lower end, the front of the chute is provided with an opening 45 and the lower portion of the back of the chute is curved toward the lower end of the front so as to form a means for guiding material toward the opening 45 and so as to close the lower end of the head except for the opening 45 and an opening 45a in the front half of the bottom of the head.

A guide 46, formed of wood or similar material, is attached to each of the two opposite sides of the lower end of the head 44 by means of screws 46a. Said guide is substantially triangular in shape, the base of the triangle being disposed horizontally somewhat below the elevation of the upper straight portion of the belt 23, the vertical side being disposed substantially along the downwardly produced vertical center line of the side of the head 44, and the hypotenuse extending from a point on the head above the opening 45 to a point adjacent the outer end of the upper half of the belt 23. The outer ends of the two guides are held in fixed spaced relation by means of a rod 47, the ends of which are rigidly attached thereto.

A drum 48 disposed on a horizontal axis at right angles to the planes in which the guides 46 are located extends between the two guides and is so located that a portion of the cylindrical surface thereof closes the opening 45a in the bottom end of the head 44. The drum 48 is provided with a longitudinal axial aperture within which a shaft 49 is secured in fixed relation thereto. Apertures are provided in the guide members, said shaft being journaled in said apertures and extending outwardly a substantial distance at one end thereof. On the extended end of the shaft 49 a pulley 50 is mounted in fixed relation therewith. A belt 51, in frictional engagement with the circular periphery of the pulley 50, is driven by an electric motor, a nearby line shaft, or an equivalent source of rotary mechanical power.

An inner guide 52 is supported from the guides 46 by means of screws 52a and is disposed between the guides 46 extending from adjacent the lower front portion of the drum 48 to a point adjacent the outermost end of the upper straight portion of the belt 23. The inner guide 52 has a bottom section 52b extending outward and downward from a point adjacent the drum 48 to a point slightly above the inner end of the upper straight portion of the belt 23. The side portions of the inner guide 52 extend downward and inward from the guides 46 to a point slightly above the belt 23.

A sliding gate 53 is retained in vertically slidable relation in front of the opening 45 by means of the vertically disposed guides 53a, said guides being attached to the front of the head 44. Said sliding gate is provided with a toothed rack 54, said rack being vertically disposed and attached to the outer surface of said gate. A pinion 55 is so disposed that the teeth thereof are meshed with the teeth of the rack 54. Said gear is mounted on a shaft 56 in fixed relation thereto. The gate operating shaft 56 extends through and outward of the guides 46 and is journaled in bearings 57 and 58, both of which are attached to the guides 46 on the outer sides thereof.

The gate operating shaft 56 is connected to the driven shaft 49 through suitable transmission means to provide for either forward or reverse rotation thereof, said means comprising a gear case 59 in which a bevel gear 67, mounted on an extended portion of said gate operating shaft 56 is in constant mesh with two diametrically located small bevel pinions 63, said pinions being loosely mounted on a shaft 61 and said shaft being journaled in apertured bosses 60 provided in the case 59. The shaft 61 carries on its medial portion a shiftable clutch sleeve 64 provided with jaw clutch members 64a at each end thereof for engagement with jaw clutch members 63 formed on the inner faces of the pinions 62. A pair of spaced flanges 65, adapted to receive a shipper lever therebetween are formed at the middle portion of the clutch sleeve 64. The extended portion of the gate operating shaft 56 is journaled in an apertured boss 66 concentrically located on the external surface of the inner side of the case 59. The shaft 61 of the transmission means is connected to the driven shaft 49 by means of the bevel gears 68 and 69, said gears being mounted respectively on the shafts 61 and 49 in fixed relation thereto. A downwardly projecting bracket 70, attached to the case 59, carries at its lower end a bearing 70b in which the shaft 49 is journaled.

The outer side of the gear case 59 consists of a removable disk 59a at the center of which is an aperture 71. A shifting lever 73, extending into the interior of said gear case and engaging with the groove formed by the flanges 65 of the shiftable clutch sleeve 64 is pivotally mounted between two lugs 72 located at either side of the aperture 71 by means of the pin 73b.

The shifting lever 73 is operated by an electric solenoid device comprising a plunger 74 and a solenoid 75, said solenoid having an upper coil 75a and a lower coil 75b. A forked upper portion 74a of the plunger 74 is pivotally and dependingly attached to the outer end of the shifting lever 73 by means of the pin 74b. That portion of said plunger which is disposed within the solenoid 75 has a middle portion of non-magnetic material and end portions of magnetic material, said middle portion being disposed symmetrically with respect to the solenoid 75 when the shifting lever 73 is at its mid-position.

Electrical wires 77 and 78 are connected to the terminals of the upper coil 75a and electrical wires 78 and 79 are connected to the terminals of the lower coil 75b. The wire 78, which is connected to one terminal of each of the two coils 75a and 75b, is connected to one terminal of a single pole, single throw switch 80 and the remaining terminal of said switch is connected by means of a wire 81 to one terminal of a source of electrical energy, such as a battery 82. The remaining terminal of the source 82 is connected by means of a wire 83 to the moving contact 40. Wires 77 and 79 are connected respectively to contacts 42 and 41. The modified form of my invention, shown in Figs. 5 and 6, differs from the preferred form in that a relatively large drum 84 is substituted for the belt 23 with its associated small drums 14 and 15, and certain modifications, incidental to this change, have been made as will be described.

The drum 84 is generally cylindrical in shape with an outward flange 84b at each end of the curved surface 84a. The circular end portions 84c of said drum are axially apertured and flanged hubs 84d are attached thereto with the apertures of the hubs and of the end portions alined for passage of a shaft 15b therethrough. The drum 84 is mounted on the shaft 15b in fixed relation therewith.

The guide 85 and the inner guide 87 are similar to the guides 46 and 52 of the preferred form except that their proportions are suitable for cooperation with the drum 84.

The base 7, and the parts supported thereby, are placed in a slightly different position relative to the head 44, and the parts supported thereby, than in the preferred form in order to position the drum 84 to receive, on its upper surface, the material delivered by the drum 48.

*Operation*

The shaft 49 and the discharge drum 48 mounted thereon are driven in a clockwise direction, when viewed as shown in Fig. 1, by means of a belt 51, said belt passing over pulley 50 on said shaft and a pulley on a nearby line shaft or motor. The drum 15 is driven in a clockwise direction, when viewed as shown in Fig. 1, by means of the electric motor 18, the rotary power being transmitted from the motor shaft 18c to the drum through the coupling 19, the shaft 20, the worm 22, the worm wheel 17, and the shaft 15b. The upper portion of the belt 23, being in frictional engagement with the drum 15, is driven outward or to the right when viewed as shown in Fig. 1, the drum 14 serving only as an idler pulley for said belt.

The head 44 is connected at its upper end to a source of material such as a hopper. The material falls by gravity from said source through the interior of the head 44 and passes, with the assistance of the outward moving upper surface of the drum 48, through the portion of the aperture 45 which is not covered by the gate 53. The material is then carried outward from this point on the surface of the drum 48, which is revolving clockwise or in a direction outward of the aperture 45. The material falls by gravity from the drum 48 onto the guide 52 where it flows over the downward sloping lower portion 52b of the guide 52 and is delivered to the horizontal upper portion of the moving belt 23. The belt 23 is driven in an outward direction and carries the material outward until the material falls by gravity from the surface of the belt at the point where the belt is curved about the drum 15. In normal operation, the straight part of the upper portion of the belt 23 has upon it a continuous layer of material from the point where the material falls from the guide 52 onto said belt to the point where the material falls from the curved portion of the belt. The weight of this layer of material is supported by the belt 23 which is supported in turn by one half of the swingably mounted frame 11. When the predetermined amount of material for which the machine is adjusted is flowing through the machine, the frame 11 is substantially in a horizontal position. If the amount of material flowing is diminished for any reason, the framework 11 thus relieved at its outer end of a portion of the weight of the material previously carried, rises. The portion of the frame 11 on the opposite side of the point at which the frame is pivoted, deflects downward. This downward deflection swings the scale beam 29 and results in movement of the contact 40 into engagement with the contact 42, thus closing the circuit to the upper winding 75a of the solenoid 75. The upper winding of the solenoid being energized pulls downward on the plunger 74 thus causing the clutch member 64 to engage with the upper clutch member 63. The beveled gear 67 is then driven by the beveled pinion 62, said beveled gear driving the shaft 56 and the pinion 55. The pinion 55 being engaged with the rack 54 causes upward movement of the rack and the gate 53 to which the rack is attached. Upward movement of the gate 53 allows an increase in the flow of material, said increase in the flow of material causing the frame 11 to again assume a substantially horizontal position.

If the flow of material increases relative to the predetermined flow desired, the outer portion of the frame 11 will be deflected downward thus bringing the contact 40 into engagement with contact 41 which will energize the lower coil 75b of solenoid 75, thus causing engagement of the clutch member 64 with the lower clutch member 63. This will cause movement of the gate 53 in a direction opposite to that previously described and hence will reduce the flow of material.

The weight 25 is used to balance the frame 11 when no material is being carried through the machine. The set screw 25b is used to hold said weight in position when a balance has been secured.

The weight 26 is used to balance the weight of the layer of material on the belt 23, and moving this weight toward the free end of the threaded bar 24 will increase the weight of material required on the belt to obtain a balance of the frame 11. It is obvious that if the belt 23 is moving at a constant speed and always has upon it a layer of material of a predetermined weight, a certain constant weight of material will be carried per unit of time by said belt. The sliding weight 29a on the scale beam 29 is used in cooperation with the weight 26 as a fine adjustment means whereby a closer adjustment may be made than if the weight 26 alone were used for adjustment. Moving the sliding weight 29a outward on the scale beam 29 will reduce the amount of material required on the belt 23 for balancing of the frame.

The air dashpot comprising the plunger 37 in the cylinder 38 serves to prevent rapid movement of the frame 11.

It is apparent that if my machine can be adjusted to maintain a flow of a predetermined weight of material per unit of time, it also can be adjusted to maintain a predetermined volume of material per unit of time if the weight per unit volume of the material is known.

It will be seen that the operation of the modified form of my invention is very similar to that of the preferred form. The upper surface of the large drum 84 moves in an outward direction with respect to the head 44 and carries a layer of material outward in a manner similar to that of the conveyor belt 23 of the preferred form. The remaining moving parts of the modified form are similar to the corresponding parts of the preferred form and operate similarly.

From the foregoing description it will be seen that I have invented a new and highly efficient selectively adjustable means for automatically maintaining a predetermined constant flow of granular or powdered materials through conveying or distributing systems.

It is obvious that two or more machines of the type which I have invented can be used to particular advantage where two or more materials, to be mixed in definite proportions, are to be delivered to a mixing machine. The chute associated with the supply of material to each machine would be fed from a source of one of the several materials to be mixed and each machine would be adjusted to deliver the required flow of the particular material handled by it to a common trough or conveyor leading to the mixing machine.

It will, of course, be understood that various changes may be made in the form, details, arrangement and proportions of the various parts without departing from the scope of the present invention.

What is claimed is:—

1. In combination with a material discharge means having a gate for varying the discharge therefrom, a weighing scale having mounted thereon material conveying means receiving the material discharged, electrically controllable mechanical means for moving said gate toward its closed and open positions, said last mentioned means including a pair of electrically actuatable control elements each arranged for control of said means for movement thereof in one direction, electrical contacts actuated by deflection of said scale, and an electrical circuit for each of said electrically actuatable control elements said electrical contacts being respectively connected to open and close the circuits to said electrically actuatable elements.

2. In combination with a material discharge means having a gate for varying the discharge therefrom, a weighing scale having mounted thereon material conveying means receiving the material discharged, a source of electrical energy, electromagnetic mechanism for controlling the movement of said gate toward its open position, a second electromagnetic mechanism to control movement of said gate toward its closed position, said electromagnetic mechanism each including a coil and an armature member, and electrical contacts actuated by deflection of said scale for selectively controlling the flow of electrical current from said source to one or the other of said two coils.

3. In combination with a material discharge having a gate for varying the discharge therefrom, a weighing scale constructed to receive material discharged and to cause said material to move thereacross, mechanical means adapted to vary the position of said gate, a source of continuously rotative mechanical power, a transmission mechanism connecting said gate varying means to said source of power, said mechanism being adapted to drive said means in forward or reverse direction and means dependent upon the deflection of said scale for selectively controlling said transmission mechanism.

4. In combination with a material discharge having a gate for varying the discharge therefrom, a weighing scale constructed to receive material discharged and to cause said material to move thereacross, means adapted to vary the position of said gate, a source of rotary power, a transmission mechanism connecting said means to said source of power, said mechanism being shiftable to drive said means in forward or reverse direction, electromagnetic means for shifting said mechanism, and electrical means actuated by deflection of said scale for controlling said electromagnetic means.

5. In combination with a material discharge having a gate for varying the discharge therefrom, mechanical means for varying the position of said gate, a source of power, a mechanical transmission mechanism connecting said gate varying means to said source of power, said mechanism being adapted to connect said means for driving in forward or reverse direction, two electrical control elements arranged to respectively actuate said mechanism to cause the same to drive said means in forward or reverse direction, a weighing scale constructed to receive material discharged and to cause said material to move thereacross, a source of electrical energy, and electrical contacts actuated by deflection of said scale for selectively controlling the flow of electrical current from said source of energy to one or the other of said control elements.

6. In combination with a material discharge means having a gate for varying the discharge therefrom, a weighing scale having mounted thereon material conveying means receiving the material discharged, electrically controllable means for moving said gate toward its open and closed positions, and a pair of electrical circuits connected to said electrically controllable means for respectively energizing said means to produce opening and closing movements of said gate, electrical contacts connected to non-simultaneously close and open said circuits, said contacts being actuated by deflection of said scale and said electrical circuits both being de-energized when said scale is balanced.

7. In combination with a material discharge member having mechanically actuated means for varying the discharge therefrom, a source of mechanical power, a mechanical transmission mechanism connecting said discharge varying means to said source of power, two electrical control elements arranged to respectively actuate said transmission mechanism to cause increase or decrease in said discharge, a weighing scale constructed to receive material discharged and to cause said material to move thereacross, a source of electrical energy, and electrical contacts actuated by deflection of said scale for selectively controlling the flow of electrical current from said source of energy to one or the other of said control elements.

8. Feed regulating apparatus having in combination, a material discharge member, a movable gate for controlling the rate of flow of material from said member, a gate-operating mechanism mechanically actuatable in forward or reverse direction to move said gate respectively toward or away from its closed position, a source of mechanical power for actuating said mechanism, controllable means for mechanically connecting said source to said mechanism to actuate the same in forward or reverse direction, a pair of electrically actuated control elements arranged for respectively causing said connecting means to make connections for forward or reverse movement of said mechanism when a corresponding one of said elements is energized, a deflectable element mounted in position to receive material discharged and means controlled by deflection of said last mentioned element for energizing one or the other of said electrically actuated control elements.

9. Feed regulating apparatus having in combination, a material discharge member, a movable gate for controlling the rate of flow of material from said member, a gate operating mechanism mechanically actuatable in forward or reverse direction to move said gate respectively toward or away from its closed position, an independent source of mechanical power for actuating said mechanism, electrical means actuatable to cause said source to drive said mechanism in one direction and also actuatable to cause said source to drive said mechanism in the other direction, a pair of actuating circuits for said electrical means, each of said circuits being connected to operate said electrical means for causing movement of said gate in one of its respective directions of movement when energized, a deflectable element mounted in position to receive material discharged and means controlled by deflection of said last mentioned element for selectively and non-simultaneously energizing said circuits.

WILLIAM N. PAXTON.